(12) United States Patent
Ahn et al.

(10) Patent No.: US 6,365,067 B1
(45) Date of Patent: Apr. 2, 2002

(54) MERCAPTOALCOHOL CORROSION INHIBITORS

(75) Inventors: Young Soo Ahn, Missouri City; Vladimir Jovancicevic, Richmond, both of TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/636,095

(22) Filed: Aug. 10, 2000

Related U.S. Application Data

(60) Provisional application No. 60/148,600, filed on Aug. 12, 1999.

(51) Int. Cl.[7] ............................. C23F 11/16; C23F 11/10
(52) U.S. Cl. .................. 252/389.23; 252/391; 252/395; 422/7
(58) Field of Search ............................. 252/395, 389.23, 252/391; 422/7

(56) References Cited

U.S. PATENT DOCUMENTS

| | | | | |
|---|---|---|---|---|
| 3,282,848 A | * | 11/1966 | Haslam | ........................ 252/105 |
| 3,462,496 A | | 8/1969 | Fletcher et al. | |
| 4,317,758 A | * | 3/1982 | Bruning | ........................ 524/202 |
| 4,608,191 A | * | 8/1986 | Wu | ........................ 252/8.555 |
| 4,655,287 A | * | 4/1987 | Wu | ........................ 252/8.555 |

FOREIGN PATENT DOCUMENTS

| | | | |
|---|---|---|---|
| CH | 458048 | | 8/1968 |
| DE | 1521919 | | 1/1970 |
| DE | 2457235 A | * | 6/1976 |
| DE | 4333127A 1 | | 3/1995 |
| EP | 55158278 | | 9/1980 |
| EP | 0176990 | | 4/1985 |
| FR | 2528061 | | 12/1983 |
| GB | 1103399 | * | 2/1968 |
| GB | 2121397 A | * | 12/1983 |
| WO | WO 95/09255 | * | 4/1995 |

OTHER PUBLICATIONS

*Chemical Abstract* 1972:514043; 77:114043 of DE 2063986.

*Chemical Abstract* 1976:450560; 85:50560 of N. K. Patel, et al. "Inhibition by Some Thiocompounds of the Corrosion of Copper in Monochloracetic Acid Solution," Br. Corros. J. (1975), 10(4), 205–6.

(List continued on next page.)

*Primary Examiner*—Margaret Medley
(74) *Attorney, Agent, or Firm*—Madan, Mossman & Sriram P.C.

(57) ABSTRACT

Compositions and methods have been discovered for inhibiting corrosion of metals, particularly iron alloys, in contact with fluids, either hydrocarbons, alcohols, or aqueous fluids, employing mercaptoalcohols. The mercaptoalcohols should have at least one water solubilizing hydroxyl group. In particular, suitable mercaptoalcohols have the formula:

$$(HS)_n-R-(OH)_m$$

where R is a straight, branched, cyclic or heterocyclic alkylene, arylene, alkylarylene, arylalkylene, or hydrocarbon moiety having from 1 to 30 carbon atoms; n and m each independently averages from 1 to 3; and the heteroatom in the heterocyclic moiety substituent, if present, may be N, O, S and/or P. Preferred mercaptoalcohols include 2-mercaptoethanol, 2-mercaptopropanol, 1-mercapto-2-propanol, and 2-mercaptobutanol, in part because they are soluble in many fluids. These corrosion inhibitors show improved inhibition of both generalized and localized corrosion, specifically in high shear and high flow environments.

5 Claims, 3 Drawing Sheets

OTHER PUBLICATIONS

*Chemical Abstract* 1977:109908; 86:109908 of DE 2457235.

*Chemical Abstract* 1980:641294; 93:241294 of DE 2911242.

*Chemical Abstract* 1984:176906; 100:176906 of FR 2530623.

*Chemical Abstract* 1985:478258; 103:78258 of P. Gupta, et al., "Inhibitive Action of Some Mercaptans Toward the Corrosion and Dezincification of 60/40, 63/37 and 70/30 Brasses in 13.4 N Ammonium Hydroxide," Proc.–Int. Congr. Met. Corros. (1984), vol. 4, pp. 139–143.

*Chemical Abstract* 1986:444915: 105:44915 of EP 176990.

*Chemical Abstract* 1987:640641; 107:240641 of K. M. Moon, et al., "The Effect of Inhibitors Effecting Hydrogen Embrittlement and Anti–corrosion Effect of a High Tensile Steel," Han'guk Pusik Hakhoechi (1987), 16(2), pp. 10–18.

*Chemical Abstract* 1989:443803; 111:43803 of JP 63243283.

*Chemical Abstract* 191:251981; 114:251981 of C. S. Nandeesh, et al. "2–Mercaptoethanol as Inhibitor on Corrosion of Copper Single Crystals in 0.1M Sulfur Acid," Bull. Electroche (1990), 6(11), 864–9.

*Chemical Abstract* 1992:131306; 116:131306 of DE 4119383.

*Chemical Abstract* 1997:453241; 127:65504 of JP 09132562.

*Chemical Abstract* 1997:789226; 128:51218 of N. S. Hassan, "The Influence of Additives Containing Sulfur on the Corrosion Resistance of Steel Alloy in Mixed Acids," Al–Azhar Bull. Sci. (1996), 7(1, Pt. 1), pp. 183–191.

*Chemical Abstract* 1998:25513; 128:143007 of JP 10001690.

*Chemical Abstract* 1985:148728; 102:148728 of US 4495336.

Kotone etal.62968g Anticorrosive agents, 6001 Chemical Abstracts, Columbus.Ohio, US, vol. 80 (1974) 25–03,No.12.

* cited by examiner

MERCAPTOALCOHOL CORROSION INHIBITORS

This application claims the benefit of U.S. Provisional Application No. 60/148,600 filed Aug. 12, 1999.

FIELD OF THE INVENTION

The present invention relates to methods and compositions for inhibiting corrosion, and more particularly relates, in one embodiment, to methods and compositions for inhibiting corrosion employing mercaptoalcohols.

BACKGROUND OF THE INVENTION

It is well known that steel tubulars and equipment used in the production of oil and gas are exposed to corrosive environments. Such environments generally contain acid gases ($CO_2$ and $H_2S$) and brines of various salinities. Under such conditions the steel will corrode, possibly leading to equipment failures, injuries, environmental damage and economic loss. Further in some cases, drilling fluids have acid intentionally added thereto in order to acidize the formations to enhance hydrocarbon recovering. This added acid also causes corrosion problems.

While the rate at which corrosion will occur depends on a number of factors such as metallurgy, chemical nature of the corrosive agent, salinity, pH, temperature, flow rate, etc., some sort of corrosion almost inevitably occurs. One way to mitigate this problem consists of using corrosion inhibitors in the hydrocarbon production system.

It is known in the art that the corrosion of iron and iron-based alloys such as steel alloys in contact with oil-in-brine emulsions can be inhibited by treating the emulsions with oil soluble, water soluble or water-dispersible nitrogen-containing, phosphorus-containing and/or sulfur-containing corrosion inhibitors. Not all corrosion inhibitors perform acceptably in all applications, e.g. severe applications such as high shear and high flow rate environments. Current technology for high shear/high flow applications also includes mercaptocarboxylic acid (e.g. mercaptoacetic acid) used with other conventional corrosion inhibitors (e.g. imidazolines).

Broad statements like those in U.S. Pat. No. 3,462,496 that mercaptoalcohols are known to be useful as corrosion inhibitors are not helpful in directing one having ordinary skill in the art to choosing which compositions would be effective as corrosion inhibitors in particular applications. For instance, one of ordinary skill in the art would not know which compounds would be useful in protecting copper or steel or other iron alloys in contact with aqueous or hydrocarbon environments over particular temperature or pressure ranges, and the like, based only upon such very sparse teachings. The minimal instruction of U.S. Pat. No. 3,462,496 also does not teach the importance that the mercaptoalcohols should be water soluble in certain environments.

It would be advantageous if a new corrosion inhibitor were discovered that would be an improvement over the presently known systems.

SUMMARY OF THE INVENTION

Accordingly, it is an object of the present invention to provide a corrosion inhibitor composition that is effective in inhibiting the corrosion of steel surfaces in oil field tubing and equipment, particularly both general and localized corrosion.

It is another object of the present invention to provide a water-soluble corrosion inhibitor that has relatively poor chelation of and lower solubility of iron complexes, as well as increased film persistence.

In carrying out these and other objects of the invention, there is provided, in one form, a corrosion inhibitor composition having at least one mercaptoalcohol.

DETAILED DESCRIPTION OF THE INVENTION

Figure 1A:
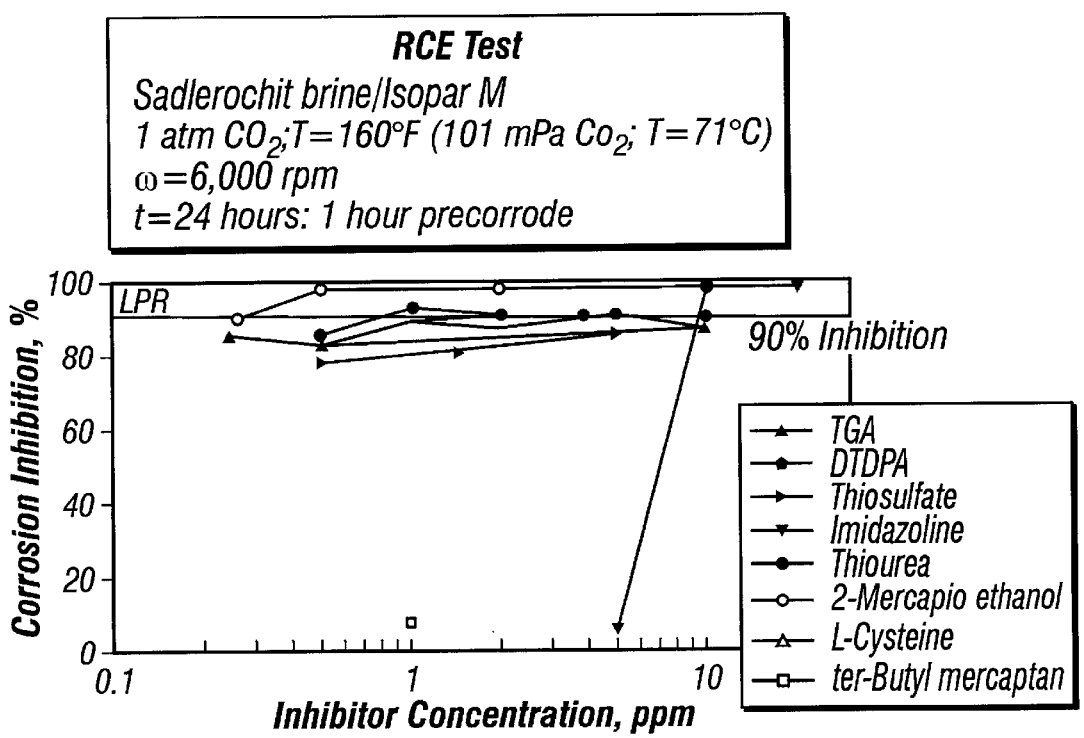
FIG. 1a is a graph of corrosion inhibition (%) measured by linear polarization resistance (LPR) for seven different sulfur-containing corrosion inhibitor candidates and an imidazoline reference material as a function of concentration.

It has been discovered that corrosion inhibition, particularly inhibition of localized corrosion (i.e. a high level of protection), as well as generalized corrosion, is improved using mercaptoalcohols. Additionally, the mercaptoalcohols have relatively poor chelation of and relatively lower solubility of iron complexes, and thus are unlikely to chelate/dissolve the surface iron of the metal structure that is being protected, as compared with other sulfur-containing corrosion inhibitors (e.g. thioglycolic acid). Further, it is believed that corrosion inhibitors containing the mercaptoalcohols of this invention have increased film persistency on the surface of the iron or steel or other surface being protected (e.g. through disulfide formation, in a non-limiting example).

The corrosion inhibitors of the invention are suitable to protect iron and iron-based alloys, such as steel alloys, used in connection with oil and gas production, as well as in other corrosive environments. Corrosion inhibition of mild steel is preferred in one non-limiting embodiment. Particular non-limiting environments suitable for the inventive corrosion inhibitors include downhole and flowline multiple phase oilfield applications. The inventive compounds are expected to find utility as corrosion inhibitors in the production or processing of hydrocarbon products, such as petroleum and natural gas, e.g. The corrosion inhibitors of the invention are expected to have particular use in high shear and high flow applications, although the invention is certainly not limited to such environments and will find use in other corrosive environments. High shear/high flow applications are simply some of the most severe environments for corrosion inhibitors. It is expected that if a corrosion inhibitor works well in such environments, it will work well under milder conditions. It is further preferred, in a non-limiting embodiment, to use the inventive corrosion inhibitors in continuous flow applications, although they could be used in stagnant environments. Further, it is expected that the mercaptoalcohols of this invention would be useful across broad temperature and pressure ranges.

The corrosion inhibitors useful in this invention include, but are not necessarily limited to, simple mercaptoalcohols. In particular, suitable mercaptoalcohols have the formula:

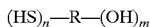

where R is a straight, branched, cyclic or heterocyclic alkylene, arylene, alkylarylene, arylalkylene, or hydrocarbon moiety having from 1 to 30 carbon atoms, and n and m each independently average from 1 to 3. The heteroatoms in the heterocyclic moiety substituent may be N, O, S and/or P. Preferably, R has from 1 to about 24 carbon atoms, and n averages from 1 to 2. In another non-limiting, preferred embodiment, R is a straight chain hydrocarbon moiety having from 1 to 8 carbon atoms, n is 1 and m is 1 to 2; most preferably, R is an alkylene group and m is also 1. In still another non-limiting embodiment, R has from 1 to 6 carbon atoms, preferably 1 to 5 carbon atoms, and most preferably 1 to 4 carbon atoms.

In a preferred, non-limiting embodiment, the mercaptoalcohol is a water soluble mercaptoalcohol having the formula:

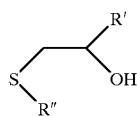

where R' and R" are independently selected from the group consisting of H, straight, branched, cyclic or heterocyclic, alkyl, aryl, alkylaryl and arylalkyl where the heteroatom in the heterocyclic moiety is selected from the group consisting of N, O, S and P, and where the total number of carbon atoms in the mercaptoalcohol is from 1 to 8.

In one non-limiting preferred embodiment, the mercaptoalcohol is 2-mercaptoethanol (2ME), 2-mercaptopropanol (2MP), 1-mercapto-2-propanol (MP), and/or 2-mercaptobutanol (2MB) or mixtures thereof. These low molecular weight mercaptoalcohols are preferred because of their wide range of solubility. For instance, 2ME is soluble in water, alcohols and hydrocarbons, and thus can serve as a corrosion inhibitor for iron alloys in contact with a wide variety of fluids. In one non-limiting embodiment of the invention, the only corrosion inhibitor used is a mercaptoalcohol, more specifically one of either of the above formula definitions, and preferably one or more from the four-member group of 2ME, 2MP, MP and/or 2MB. In another embodiment, the only corrosion inhibitor employed is 2ME.

In general, solubility of the mercaptoalcohols of this invention can be improved by lowering the number of carbons in R. Solubility in aqueous solutions can also be increased by increasing the number of hydroxyl groups. For example, if the mercaptoalcohol has a relatively large number of carbon atoms in the R moiety, its solubility in aqueous solutions may be increased by having two or three hydroxyl substituents.

Additional corrosion inhibitors may also be optionally used in conjunction with the mercaptoalcohols. More specifically, such suitable additional corrosion inhibitors include, but are not necessarily limited to, imidazolines, amides, amines, quaternary amines, phosphate esters, polycarboxylic acids, thiols, disulfides and other sulfur-containing compounds and mixtures thereof Nitrogen-containing corrosion inhibitors are preferred in one non-limiting embodiment of the invention. There is some evidence that nitrogen- containing corrosion inhibitors together with mercaptoalcohols may give a synergistic effect over the use of either type of corrosion inhibitor alone.

In the inventive corrosion inhibiting compositions, the proportion of mercaptoalcohol in the composition may range from about 0.1 to about 70 wt. %. Preferably, the proportion of mercaptoalcohol in the composition ranges from about 1 to about 40 wt. %.

Solvents or diluents may be employed together with the composition of this invention, which solvents may include, but are not necessarily limited to, water, alcohols, aromatic solvents, such as naphthas and xylene, and the like. It is important that the mercaptoalcohols of the invention be water-soluble so that they can be transported to and form a film on the metal surface initially in contact with the hydrocarbon/water mixture.

It will be appreciated that the inventive corrosion inhibiting composition of the invention can be used in any fluid (hydrocarbon-based or aqueous-based) contacting metal. By "hydrocarbon" is meant any crude oil; refined hydrocarbon; emulsion of oil-in-water or water-in-oil; whether recovered from a hydrocarbon recovery operation, used to assist with a hydrocarbon recovery operation, such as a hydrocarbon-containing drilling fluid or drill- in fluid (DIF), workover fluid, completion fluid, or the like; or produced as a by-product or waste product from a hydrocarbon refining or processing operation whether or not in emulsion form, or the like. The inventive corrosion inhibiting composition of the invention can be also used in any aqueous fluid, such as brine in one non-limiting example. Additionally, the inventive corrosion inhibiting composition can be used to inhibit corrosion that may occur in alcohols or alcohol-based fluids.

It is difficult, if not impossible, to specify with precision the amount of composition of this invention that would be suitable to add to the hydrocarbon to impart corrosion inhibition properties thereto. Such an effective amount depends on a number of factors, including, but not necessarily limited to, the nature of the hydrocarbon, the exact composition of the corrosion inhibitor (the nature of the components and their proportion), the properties of the hydrocarbon or fluid (e.g. temperature, pressure, pH, composition, contaminants, etc.), flow rates, and the like. However, in one non-limiting embodiment, the amount of composition added to a hydrocarbon to be effective may range from about 1 to about 1,000 ppm, based on the hydrocarbon, preferably from about 10 to about 100 ppm.

The invention will be further illustrated by the following examples that are merely intended to further demonstrate, but not limit, the invention.

EXAMPLE 1

Initial sparged beaker (SB) and rotating cylinder electrode (RCE) tests were performed with 2-mercaptoethanol (2ME) by itself and in formulation with nitrogen-containing compounds (i.e. imidazoline). The results showed strong corrosion inhibition of mild steel under typical oilfield conditions:>98% inhibition at 5 ppm concentration.

EXAMPLE 2

A water-soluble mercaptoalcohol corrosion inhibitor, specifically 2-mercaptoethanol (2ME) was added at 1 ppm in a $CO_2$-saturated mixture of brine and oil (volume proportion of 80:20) at 160° F. (71° C.) and 1 atm (101 mPa) and the corrosion rate was measured by linear polarization resistance (LPR), weight loss, and iron count methods. The addition of 2-mercaptoethanol resulted in a corrosion inhibition of 98% compared to 89% when conventional mercaptoacetic acid was used at the same percentage in the formulation.

EXAMPLE 3

The following seven sulfur-containing corrosion inhibition candidates were tested for corrosion inhibition using LPR, weight loss and iron count methods at various concentrations at the conditions shown at the top of FIG. 1a:

Thioglycolic acid (TGA) 3,3'-Dithiodipropionic acid (DTDPA)
Thiosulfate (ST)
Thiourea (THE)
2-Mercaptoethanol (2ME)
L-Cysteine (L-CY)
tert-Butyl mercaptan (t-BM)

Figure 1B:
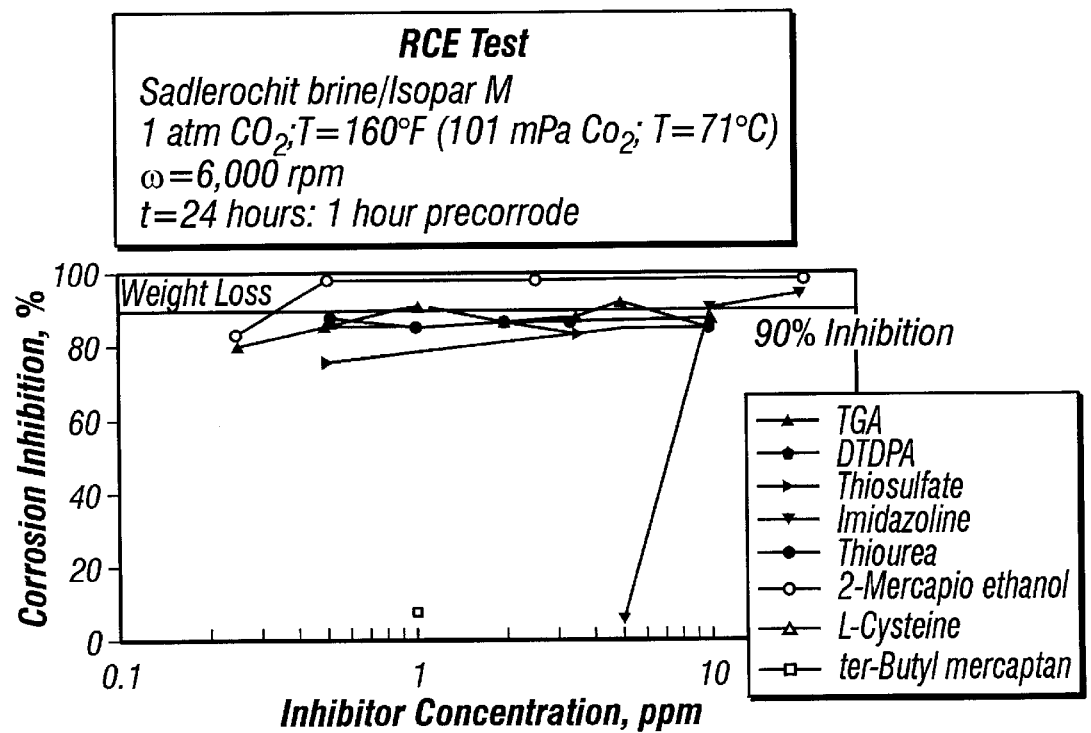
FIG. 1b is a graph of corrosion inhibition (%) measured by weight loss for the seven different sulfur-containing corrosion inhibitor candidates and the imidazoline reference material of FIG. 1a as a function of concentration.
Figure 1C:
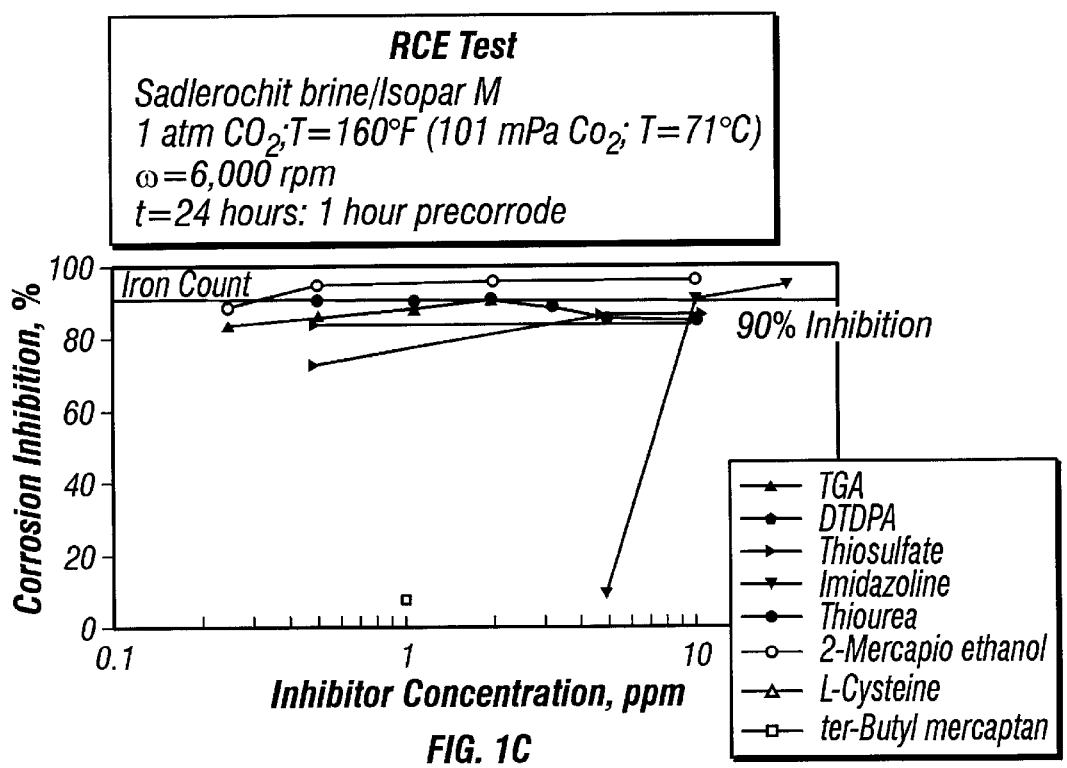
FIG. 1c is a graph of corrosion inhibition (%) measured by iron count for the seven different sulfur-containing corrosion inhibitor candidates and the imidazoline reference material of FIG. 1a as a function of concentration.
Figure 2:
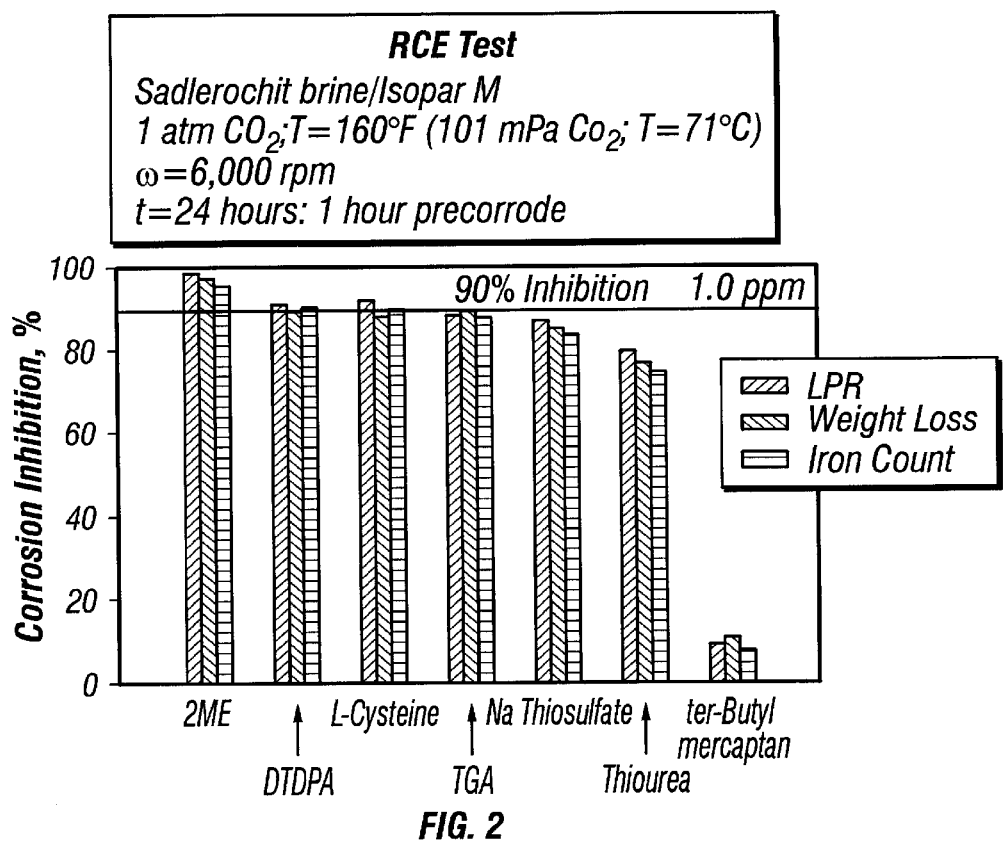
FIG. 2 is a graph of corrosion inhibition (%) measured by LPR, weight loss, and iron count from FIGS. 1a–1c for the seven best-performing sulfur-containing corrosion inhibitor candidates at a concentration of 1.0 ppm.

The LPR data is plotted in FIG. 1a; the weight loss data is plotted in FIG. 1b; and the iron count data is plotted in FIG. 1c. The seven top performing candidates had their corrosion inhibition values charted at 1.0 ppm in FIG. 2. 2ME was the only candidate where the corrosion inhibition values were consistently better than 95%. An imidazoline-based product (IM) was used as a reference.

EXAMPLE 4

Figure 3:
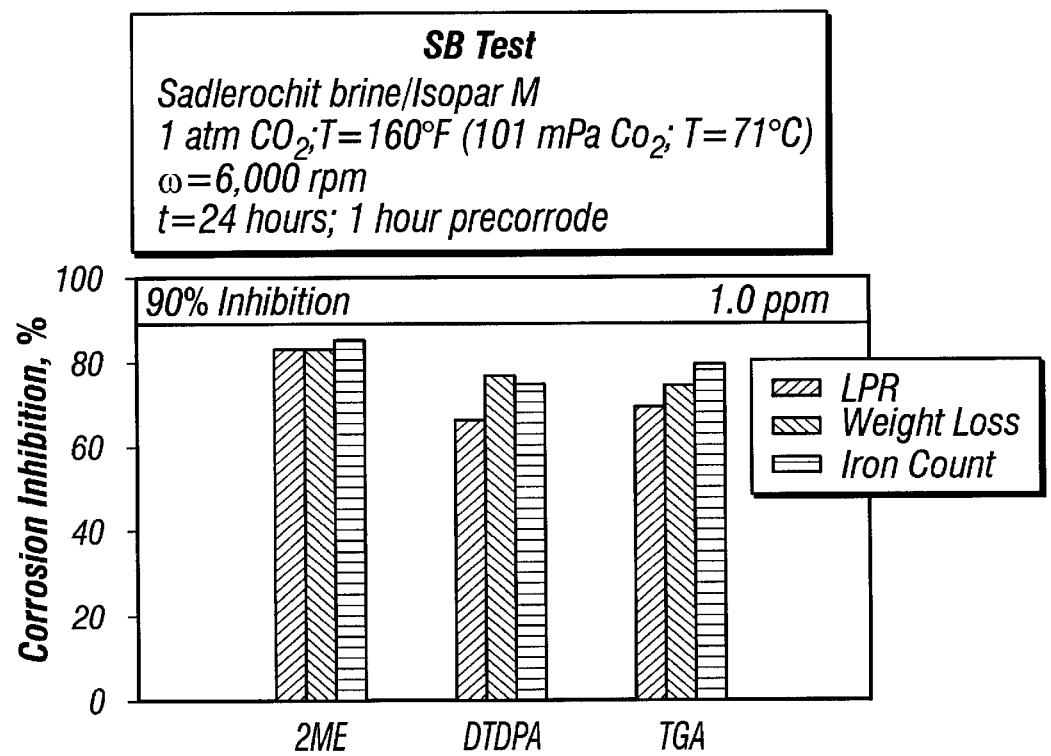
FIG. 3 is a graph of corrosion inhibition (%) measured by LPR, weight loss, and iron count for 2ME, DTDPA, and TGA in brine at a concentration of 1.0 ppm.

A sparged beaker (SB) test using an aqueous, non-hydrocarbon, e.g. brine was conducted using the conditions outlined at the top of FIG. 3 using 2ME of the invention and comparative DTDPA and TGA. Corrosion was measured using LPR, weight loss, and iron count methods. As shown in FIG. 3, the 2ME gave better results in all three methods relative to the comparative DTDPA and TGA.

EXAMPLE 5

Figure 4:
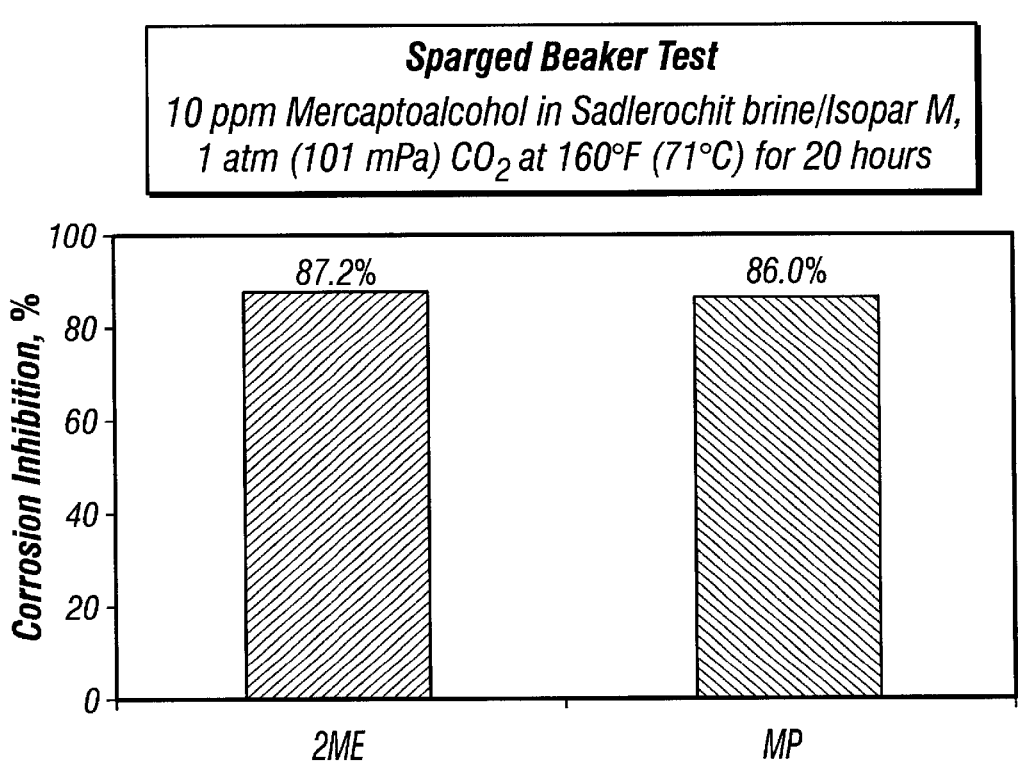
FIG. 4 is a graph of corrosion inhibition (%) measured for 2ME and 1-mercapto-2-propanol under identical conditions.

A sparged beaker (SB) test using 80/20 volume ratio brine/hydrocarbon was conducted using 10 ppm of the mercaptoalcohol under 160° F. (71° C.) and 1 atm $CO_2$ saturation (101 mPa) for 20 hours. Both 2ME and 1-mercapto-2-propanol (MP) demonstrated corrosion inhibition as seen in the results plotted in FIG. 4. The 2ME gave 87.2% corrosion inhibition and MP gave 86.0% inhibition.

In the foregoing specification, the invention has been described with reference to specific embodiments thereof, and has been demonstrated as effective in greatly improving corrosion inhibition in hydrocarbons. However, it will be evident that various modifications and changes can be made thereto without departing from the broader spirit or scope of the invention as set forth in the appended claims. Accordingly, the specification is to be regarded in an illustrative rather than a restrictive sense. For example, specific mercaptoalcohols, proportions thereof, and combinations thereof, and specific hydrocarbons, other than those specifically tried, falling within the claimed parameters, but not specifically identified or tried in a particular application to inhibit corrosion, are within the scope of this invention.

We claim:

1. A method for inhibiting corrosion of an iron-based alloy in contact with the production or processing of a hydrocarbon comprising:

providing the hydrocarbon in contact with the iron-based alloy; and adding a corrosion inhibiting effective amount of a composition to the fluid, where the composition comprises a water soluble mercaptoalcohol selected from the group consisting of mercaptoalcohols having the formula:

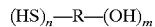

where R is a straight branched, cyclic or heterocyclic alkylene, arylene, alkylarylene, arylalkylene, or hydrocarbon moiety having from 1 to 30 carbon atoms;

n and m each independently averages from 1 to 3; and the heteroatom in the heterocyclic moiety substituent is selected from the group consisting of N, O, S and P, and having the formula:

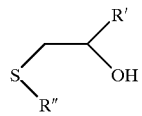

where R' and R" are independently selected from the group consisting of H, straight, branched, cyclic or heterocyclic, alkyl, aryl, alkylaryl and arylalkyl where the heteroatom in the heterocyclic moiety is selected from the group consisting of N, O, S and P, and where the total number of carbon atoms in the mercaptoalcohol is from 1 to 8, and at least one additional corrosion inhibitor selected from a group consisting of corrosion inhibitors consisting of imidazolines, amides, amines, quaternary amines, phosphate esters, polycarboxylic acids, and mixtures thereof.

2. The method of claim 1 where R is a straight, branched, or cyclic alkylene, arylene, alkylarylene, arylalkylene, or hydrocarbon moiety having from 1 to 8 carbon atoms; n is 1 and m averages from 1 to 3.

3. The method of claim 1 where in the adding of the composition to the hydrocarbon, the mercaptoalcohol is selected from the group consisting of 2-mercaptoethanol, 2-mercaptopropanol, 1-mercapto-2-propanol, 2-mercaptobutanol, and mixtures thereof.

4. The method of claim 1 where in the adding of the composition to the hydrocarbon, the proportion of mercaptoalcohol in the composition ranges from about 0.1 to about 70 wt. %.

5. The method of claim 1 where in adding the composition to the hydrocarbon, the amount of composition added ranges from about 1 to about 1,000 ppm, based on the total hydrocarbon.

* * * * *